Patented Aug. 2, 1938

2,125,533

UNITED STATES PATENT OFFICE 2,125,533

BIOLOGICALS

Howard M. Winegarden, Oakland, and Frances W. Westfall, Roland C. Hawes, and Fred W. Wood, Berkeley, Calif., assignors to The Cutter Laboratory, Berkeley, Calif., a corporation of California No Drawing. Application January 12, 1934, Serial No. 706,406

3 Claims. (Cl. 167—78)

This invention relates to biologicals and in particular to the antigens of the blackleg organism (Clostridium chauvoei), their preparation, fortification and concentration.

It is a well known immunological fact that a better grade of immunity is produced by a series of small injections of a given antigenic substance than by a single injection of a quantity of material equivalent to the total of the small injections mentioned. Although the reason for this is not known the most logical hypothesis seems to be that the human or animal organism is only able to utilize a fairly small amount of the toxin or antigen at one time in producing immunity. The remaining portion of the antigenic substances is probably eliminated as waste in the same manner as other non-nutritive foreign substances. According to this theory when small doses are given, most of the antigenic substances are utilized in producing immunity with very little or no waste. Consequently when a large number of doses are given at spaced intervals of time, most of the antigen is immunologically effective.

Instead of applying an antigen in a number of small doses attempts have been made to produce immunity by the injection of a single large dose which, although injected in a single application, is gradually released into the system at a rate such that it is as effective immunologically as a number of small doses would be. This has been done with some degree of success in connection with the immunization of animals against tetanus and diphtheria toxins but as far as we know it has never been done with respect to the antigens of blackleg.

One of the objects of this invention is the fortification of the antigens of blackleg by treatment in such a manner that their release into the system after injection is retarded to a rate at which they can be more effectively used in producing antibodies.

More specifically one of the objects of the invention is the provision of a blackleg antigen incorporated in an adsorbing agent which automatically retards its release into the system and further serves to concentrate the antigenic substance.

Another object of the invention is the provision of a method of producing blackleg toxoid.

Still another object of the invention is the provision of a new method of producing blackleg toxoid bacterin.

The invention possesses other advantageous features, some of which with the foregoing will be set forth at length in the following description where we shall outline in full one form of our invention although we do not limit ourselves to such form, since the invention as set forth in the claims, may be embodied in a number of forms.

The antigens of blackleg with which this specification particularly deals are the toxin, toxoid, natural and cultural aggressins, bacterin and toxoid bacterin. The preparation of the toxin has been disclosed by such investigators as Hanna, Leclainche, Vallee, Eichhorn, Kelser, Okuda, Kojima, and Basset and consequently there is no need of describing the details of preparing this antigen or any of the others above referred to with the exception of the toxoid and the toxoid bacterin.

In general to prepare blackleg toxin, highly pathogenic cultures in an actively growing state are inoculated into a suitable anaerobic media and incubated, following which a sterile toxin is obtained by Berkefeld filtration of the cultures.

Blackleg toxoid may be prepared from the toxin by adding a small amount of formalin to the sterile soluble toxin and incubating the toxin so treated for a few days. The incubation period should be such that the material is shown to be toxic by injection into suitable experimental animals. In practice we have found that ¼ of 1% by volume of commercial formalin with an incubation period at 37° C. of from 3 to 5 days yields a satisfactory blackleg toxoid. Commercial formalin as used herein designates the usual 40% solution.

Blackleg toxoid bacterin can be prepared by growing the blackleg organisms in a broth media suitable for producing the toxin. The bacterial cells are allowed to settle by placing the culture mixture after a suitable growth is attained in a cold room overnight. The supernatant liquid which contains the soluble toxin produced during the growth of the cells is separated from the cells proper by decantation, centrifuging or any other equivalent mechanical means, and then the cells (remaining in the residue) are killed by heating at 100° centigrade for one hour. The soluble toxin which has been rendered sterile by Berkefeld filtration is then added to the killed cells together with .25% commercial formalin and the mixture is incubated for five days at 37° C. or lower temperature for longer length of time, during which time the soluble toxin content is converted into the toxoid. Instead of adding the formalin to the mixture of the killed cells and the insoluble toxin it can be added directly to the toxin to convert the toxin to the toxoid and then the toxoid so produced can be added to the killed cells. The advantage of separating the cells from the filtrate prior to converting the toxin to the toxoid and prior to killing the cells enables the toxin to be converted to the toxoid under ideal conditions. The whole culture could for example be treated with formalin for the double purpose of killing the cells and converting the toxin to the toxoid. However the antigenic properties of the toxoid are injured by excessive concentrations of formalin and/or by excessive use of heat either as to time or degree and it has been found that the formalin and heat required to uniformly kill the cells is sufficient to injure the antigenic properties of the toxoid. Consequently it is far better to kill the cells and to convert the toxin to the toxoid by two independent and distinct steps as above outlined. In this connection it should be particularly noted that the formalin does not operate to kill the cells for the cells have been previously killed by heat. The only function of the formalin is to convert the toxin to the toxoid and to serve as a preservative. Care should be taken to carry on the incubation at temperatures not exceeding 40° for higher temperatures are likely to destroy the toxoid.

For the purpose of this specification cultural aggressins will be assumed to be the filtered non-injurious products of metabolism of blackleg bacteria often referred to as filtrates; natural aggressins, the muscle juices obtained from an animal that has been artificially killed with blackleg bacteria; and bacterin, the killed blackleg organisms, and usually but not necessarily the products of their metabolism and the liquid media in which the organisms are grown.

To fortify blackleg toxoid so that when injected into an animal it is slowly released from the point of injection into the system it is treated in the following manner: Sufficient 2 normal sodium hydroxide is added slowly and with constant stirring to the blackleg toxoid to raise its hydrogen ion concentration to approximately neutral. Its original pH value usually varies between 5.4 and 5.8. In order to bring it up to the neutral point approximately 1% of a 2 normal solution of sodium hydroxide has been required in most cases. To the neutralized toxoid there is added 10% by volume of an 11% aqueous sterilized solution of ammonium alum. The hydrogen ion concentration of the final product (that is after the alum has been added) has been found to be satisfactory when lying between 4.5 and 6.5. If the pH is below this limit additional NaOH solution should be added. The resulting mixture which contains approximately 1% of ammonium alum $(Al_2(SO_4)_3.(NH_4)_2SO_4.24H_2O)$ is thoroughly shaken and then stored in the cold for subsequent testing and usage. Following the addition of alum a large flocculent precipitate, presumably consisting of aluminum hydroxide, is formed which adsorbs on its surface the greater portion of the antigenic component of the toxoid. This precipitate will settle down so as to occupy approximately not more than one-third of the total volume of the material and since it contains most of the antigenic material the product should be shaken thoroughly before using. It will therefore be seen that the hydroxide serves to concentrate the antigenic component. This concentrated component may be further concentrated by dehydrating in any suitable manner as by filtration or evaporation.

The bacterin, the toxoid bacterin and the aggressins can be treated in an almost identical manner.

Alum and aluminum hydroxide are effective astringents and irritants and it is therefore probable that these reagents function in three distinct manners. Due to its adsorbent properties the hydroxide operates as above described to gradually release its antigenic content, and due to its astringent properties it serves to contract the body tissues around the point of injection retarding the absorption of the antigen by the body and due to its irritant properties it leads to the walling off of the antigen. On the one hand the rate at which the antigen is supplied to the body is controlled and on the other the rate at which the body can absorb the antigen is controlled, both actions taking place simultaneously. An irritant as here used designates a substance which has the property of setting up a local irritation or inflammation.

The absorption by an organism of an antigen adsorbed and/or concentrated in a vehicle as above described is sufficiently retarded so that a far greater degree of immunization is obtained. Although the increase in the immunizing power of antigens so treated has been explained on the theory of adsorption and retarded absorption it is to be borne in mind that this is merely a theory and that there is no positive knowledge of the exact mechanics by which the obtained results are produced.

Actual tests with a blackleg toxoid bacterin treated with ammonium alum as above described have shown that such an antigen may be five times as effective in small dosage as the original alum free antigen.

It is possible to use in place of the alum any reagent which will produce a hydroxide or other adsorbent vehicle in which the antigen will be incorporated and which will release the active substance when injected into an animal.

Instead of using a reagent which has adsorbent and astringent properties as well as being capable of setting up a local irritation or inflammation at the point of application of the immunizing agent it is possible to fortify the antigen with a reagent whose operation depends largely upon its ability to set up a local irritation. Starch, tapioca and toluol can be effectively used for this purpose. In fortifying blackleg filtrate for example 2% of ground, sterile, dry tapioca is added to the filtrate. The tapioca powder should preferably be fine enough to pass through a forty mesh screen. Or 40% of a sterile 5% starch solution can be added to the filtrate instead of the tapioca. A certain amount of swelling of both the starch and the tapioca occurs in the solution and as neither the starch nor the tapioca is soluble in the filtrate, it is necessary to shake the suspension thoroughly before using.

The percentages, temperatures, amounts and other values recited in this specification and the appended claims are not critical and consequently when specific quantities and conditions are recited in the claims they are to be construed as approximate values which may be varied within reasonable limits.

We claim:

1. A blackleg antigen incorporated in an adsorbent and astringent comprising aluminum hydroxide.

2. A blackleg antigen to which has been added substantially 1% of ammonium alum.

3. The method of fortifying a blackleg antigen comprising adjusting the hydrogen ion concentration of the antigen to the neutral point; adding an 11% aqueous solution of ammonium alum and adjusting the final hydrogen ion concentration so that it lies between 4.5 and 6.5.

HOWARD M. WINEGARDEN.
FRANCES W. WESTFALL.
ROLAND C. HAWES.
FRED W. WOOD.